United States Patent [19]

Strecker et al.

[11] Patent Number: 5,062,061
[45] Date of Patent: Oct. 29, 1991

[54] AUTOMATIC DIRECTION CONTROL FOR OMNI-DIRECTIONAL SHEAR WAVE SOURCES

[75] Inventors: John E. Strecker, Tonkawa; Truman R. Stiner, Blackwell, both of Okla.

[73] Assignee: Conoco Inc., Ponca City, Okla.

[21] Appl. No.: 603,985

[22] Filed: Oct. 25, 1990

[51] Int. Cl.$^5$ ............................................. G01V 1/30
[52] U.S. Cl. ........................................ 364/521; 367/75
[58] Field of Search ............... 364/457, 550, 421; 367/75

[56] References Cited

U.S. PATENT DOCUMENTS

| | | | |
|---|---|---|---|
| 3,746,842 | 7/1973 | Fowler | 364/457 |
| 3,772,503 | 11/1973 | Fowler | 364/457 |
| 4,179,741 | 12/1979 | Rossani | 364/457 |
| 4,564,909 | 1/1986 | Kramer | 364/457 |
| 4,803,666 | 2/1989 | Alford | 367/75 |
| 4,903,244 | 2/1990 | Alford | 367/75 |
| 4,922,472 | 5/1990 | Cole et al. | 367/75 |

Primary Examiner—Salvatore Cangialosi

[57] ABSTRACT

A system to control the orientation of a seismic source includes a signal processor that receives an input signal from a compass to provide an input orientation for the vibrator control electronics of an omnidirectional shear wave source. By orienting the signal generation in this manner, the need to orient the truck is obviated without negatively impacting the quality of the data. The signal processor can be eliminated if the compass output signal is already in a form that can be used by the vibrator control electronics.

8 Claims, 2 Drawing Sheets

AUTOMATIC DIRECTION CONTROL FOR OMNI-DIRECTIONAL SHEAR WAVE SOURCES

BACKGROUND OF THE INVENTION

1. Field of the Invention

The present invention pertains to automatic direction control systems for controlling the radiating direction of seismic sources and more particularly to an automatic direction control system for omni-directional shear wave sources.

2. Related Prior Art

Prior art has discussed many ways to direct the seismic energy produced in currently available seismic sources. The following patents illustrate several of the known and commonly used methods for detecting location and thereby directing energy from a source. In general, the following patents relate to systems for detecting and correcting heading errors in marine or other types of navigation systems.

U.S. Pat. No. 4,564,909, "Error Sensing System for Vessels With Absolute Zero Referencing", issued to Melvin G. Kramer, relates to an error sensing system for use in marine autopilot systems of the type having a photographic film compass disk aligned with the direction North and sensing means associated with the disk is operative to sense relative movement between the disk and the sensors in response to changes in the heading of the vessel. A first direction error surface portion on the disk has opaque and transparent areas defining a zero reference therebetween, a second magnitude error surface portion on the disk has a second zero reference position in predetermined relation to the first zero reference position and an area of variable transparency extending along the second surface portion. The first and second surface portions are defined by images along the peripheral surface of the photographic film disk. The disk sensing system has first and second light sensors aligned with the first and second surface portions, respectively, to generate direction error and magnitude error signals representative of the direction and extent of movement of the vessel away from a given heading.

U.S. Pat. No. 3,772,503, "Course Difference Logic for Use with Digital Magnetic Compass", issued to John T. Fowler, relates to an electronic circuit having logic circuitry for use with a digital compass for providing an output indication of the difference between an actual and an intended course. Digital signals provided by a digital compass are processed in conjunction with a digital signal representation of intended course position to provide an output signal representing course difference and which can be employed by display or automatic pilot apparatus.

U.S. Pat. No. 3,746,842, "Digital Magnetic Compass", issued to John T. Fowler, relates to a magnetic compass in which the compass card and gimbal mounting are all located inside a sealed enclosure filled with damping fluid. The compass card is digitally coded and photoelectric means are provided for reading the card and generating a digital number corresponding to the rotational position of the card relative to the enclosure, corrected for local magnetic variation. Means are provided for comparing the compass reading with the corrected course reading to provide an error signal or an off-course alarm if desired.

U.S. Pat. No. 4,179,741, "Magnetic Compasses", issued to Aldo Rossani, relates to a static compass capable to supply a digital indication of the magnetic head angle, comprising circuits for supplying two signals corresponding to two orthogonal components of the horizontal component of the earth magnetic field, said signals consisting of a carrier frequency, amplitude modulated according to the value of said orthogonal components, a circuit for introducing a phase shift through 90° 18 electric on one of said modulated frequencies, a circuit effecting the sum and the difference of said two signals, a circuit for measuring the difference of phase between said sum and difference signals and for introducing count pulses in a number proportional to said difference of phase in order to drive digital counters associated to digital display elements showing the head angle with respect to the horizontal component of the earth magnetic field, further including apparatus for indicating the error with respect to a selected head angle, said apparatus including an arrangement for manually entering and memorizing said head angle, a counter predisposed for counting in amplitude and sign the error between the measured head angle and the selected angle, and an analogic/digital display arranged so as to indicate the amount, the direction and the variation in time of the error between the measured orientation and the orientation as set and memorized.

SUMMARY OF THE INVENTION

The present invention pertains to a system for controlling the direction of propagation of seismic waves that are generated by sources that have the ability to propagate waves in any direction. The system of the present invention includes a compass that is rugged in order to be mounted on a truck and has an electronic output of position. The output of the compass may be fed directly to vibrator control electronics or may be fed through signal processing electronics if the output of the compass is not in a format that can be used in the vibrator control electronics. A heading from magnetic north is input into either the signal processing electronics or the vibrator control electronics. The equipment will then compute the data required to control the direction of radiation of the energy source from the heading input and the compass input.

DESCRIPTION OF THE PREFERRED EMBODIMENT

In the past, the direction of wave propagation from a shear wave seismic source was fixed in respect to the truck that the equipment was mounted on. Therefore, controlling the direction of the wave propagation was the simple matter of controlling the orientation of the truck. It is occasionally inconvenient or impossible to put the truck in the desired position. With the truck improperly positioned, the resulting seismic energy will be in the wrong direction and data quality will suffer.

Until the advent of sources that could propagate waves in any direction, nothing could be done about this problem. The present invention is an automatic system that determines magnetic north and references the direction of sweep propagation to it independent of the truck position. This allows a degree of precision that was unattainable before.

In addition to the repeatability of the direction of wave propagation, the efficiency of the "Vibroseis" crew will also increase. The vibrator truck drivers are now not concerned with the orientation of their trucks so they will spend less time driving between shot points in difficult terrain areas.

If desired, the system could be controlled remotely through standard data transmission links. This would allow one person to control the direction of the energy regardless of the number and orientation of the vibrator trucks.

Figure 1:
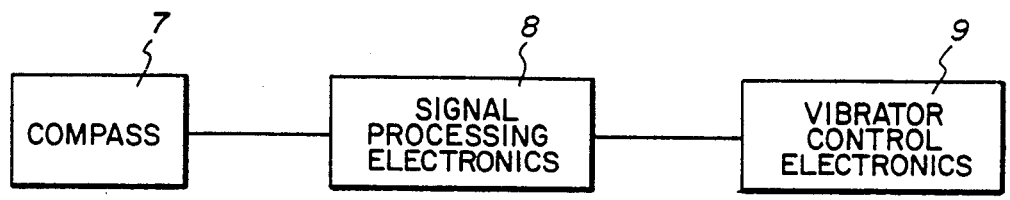
FIG. 1 is an automatic direction control system for omnidirectional shear wave sources.

A schematic of the proposed system is shown in FIG. 1. A compass 7 can be any unit that is rugged enough for truck mounting and has an electronic output of position. The output of compass 7 goes to either signal processing electronics 8, if they are required, or to vibrator control electronics 9. Signal processing electronics 8 will be required if the output of compass 7 is not in a form that can be used in vibrator control electronics 9.

In use, an operator may input a heading from magnetic north into either signal processing electronics 8 or vibrator control electronics 9. The equipment will then compute the data required to control the direction of the energy source from the heading input and the compass input. However, a manual input by the operator is unnecessary since the preferred embodiment of the present invention is designed so that the heading may be input automatically so that a high degree of accuracy may be maintained.

Figure 2:
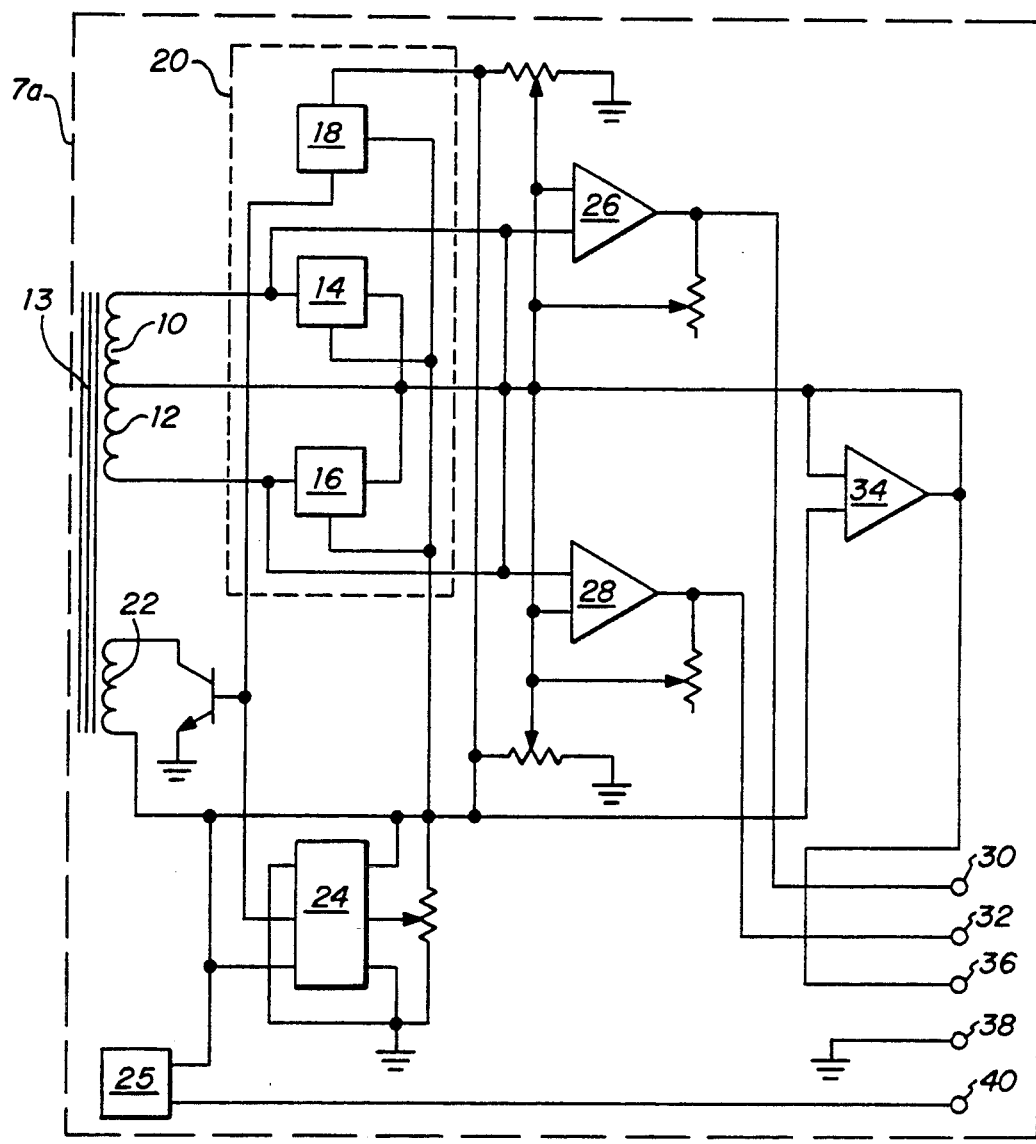
FIG. 2 is the analog section of the compass of FIG. 1.
Figure 3:
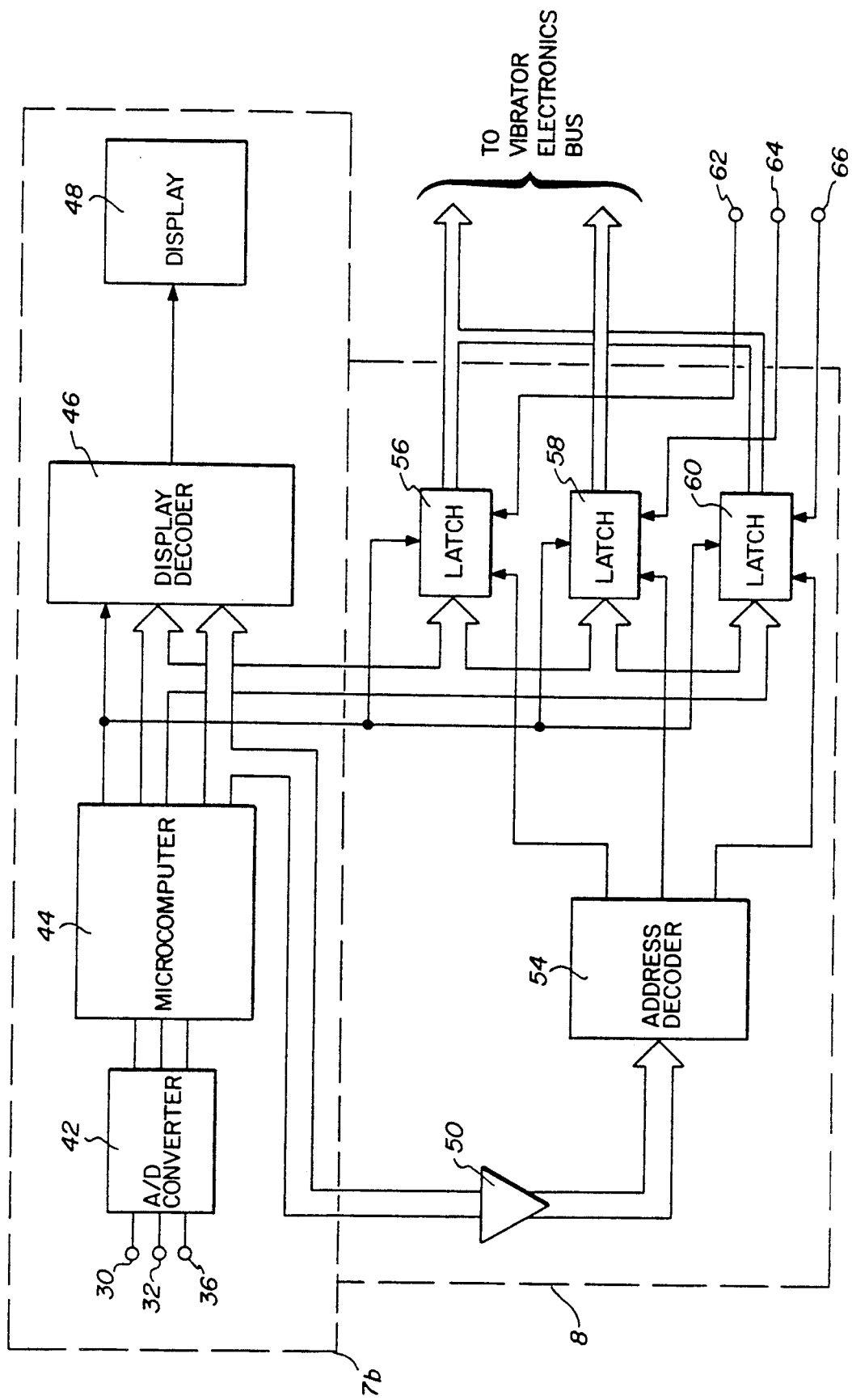
FIG. 3 is the digital processing section of the compass of FIG. 1 along with the interface between the compass and the vibrator electronics of FIG. 1.

Using an electronic flux gate compass 7a and 7b, as shown in FIGS. 2 and 3 a magnetic heading is shown on the local display. The magnetic compass data is also available for decoding to put in a format which can be read by vibrator electronics 9. This decoding circuit is to make the magnetic heading available for vibrator electronics 9 when this data is required. A decoding scheme is shown in FIG. 3. Data is latched by digit into data latches which are read by vibrator electronics 8 when a new compass angle is needed for orientation of the vibrator.

Referring now to FIG. 2, the analog section 7a of compass 7 of FIG. 1 is illustrated in schematic form. Orthogonal sense windings 10 and 12, coupled by core 13, are arranged to measure the vectors of the earth's magnetic field parallel to the longitudinal and transverse axis of the vibrator vehicle. Electrical signals, proportional to the magnitudes of these vectors are fed through coding sections 14 and 16 of integrated circuit 20. An excitation signal from integrated circuit 24 is fed to coil 22 coupled to core 13 and to analog switch 18 of integrated decoding circuit 20. The transverse and longitudinal signals from coils 10 and 12 are amplified and filtered by amplifiers 26 and 28 to provide a proportional analog transverse signal and longitudinal signal at terminals 30 and 32 respectively. The output of amplifier 34 provides an analog reference signal at terminal 36. Terminal 38 indicates power supply ground and terminal 40 indicates the 12 volt power supply for voltage regulator 25. The reference signal at terminal 36 is set by amplifier 34 to provide one half the regulated supply voltage. This allows the analog transverse and longitudinal signals to swing plus and minus with respect to the analog reference without having to add a negative power supply.

Referring now to FIG. 3, digital section 7b of compass 7 of FIG. 1 is illustrated. The proportional analog signals representing the transverse signal and the longitudinal signal and the reference signal are received by analog to digital converter 42 which converts the signals to digital format and feeds them to microcomputer 44. Microcomputer 44 is an Intel model number 8748 microcomputer programmed with a NASA algorithm titled, "Smart Compass 8748" which converts the digital value to a decimal number in degrees. The microcomputer 44 outputs information one digit at a time in binary coded decimal format. A $\overline{WR}$ (write not) line contains information as to whether a digit should be read or not since microcomputer 44 outputs information one binary coded decimal digit at a time. The output lines of microcomputer 44 go to display decoder 46 which takes the digital information and converts it to a number which is fed to local display 48 where the compass reading is displayed. The lines between microcomputer 44 and display decoder 46 also feed to the signal processing electronics block of FIG. 1.

I the lower portion of FIG. 3 signal processing electronics 8 which operate as an interface to vibrator electronics 9 is illustrated in schematic form. The digit address lines, which consist of three digits, are fed through inverter 50 before being fed to address decoder 54. The data lines are fed to each of the three data latches 56, 58, and 60.

The $\overline{WR}$ line connects to each of the data latches and indicates when the latch should latch data present on the data lines. Latches 56, 58, and 60 hold on to data until the data is ready to be read by the vibrator electronics. Signals ar input from vibrator electronics 9 through terminals 62, 64, and 66 to indicate when the vibrator electronics is ready to receive data. When these signals are received by the latches 56, 58, or 60, the data is made available from the latches and fed to the vibrator electronics bus. The vibrator electronics control may be of any type currently in use in the art. In the preferred embodiment, Pelton Advance II vibrator control electronics are used.

In actual operation, as stated previously, an operator may input a heading from magnetic north into the vibrator control electronics. In the alternative, the heading from magnetic north may be input automatically. The vibrator control electronics then computes the data required to control the direction of the energy source from the heading input and the compass input.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method for controlling the orientation of an omnidirectional shear wave source in a system having vibrator control electronics comprising the steps of:
   receiving an electronic output of position orientation from a compass;
   feeding said electronic output through signal processing electronics;
   converting said electronic output to a format used in the vibrator control electronics; and
   transferring said converted electronic output of the compass to the vibrator control electronics to direct the orientation of the omnidirectional shear wave source.

2. The method according to claim 1 wherein said receiving step includes the step of:
   obtaining a signal representing a heading from magnetic north.

3. The method according to claim 2 wherein said converting step includes the step of:
   computing orientation angle data required by the vibrator control electronics to control the direction of radiation of the energy source from the heading input and the compass input.

4. An apparatus for controlling the orientation of an omnidirectional shear wave source in a system comprising:
   vibrator control electronics;
   means for obtaining an electronic output of position orientation of the omnidirectioal shear wave source;
   means associated with said obtaining means for processing said electronic output through signal processing electronics to convert said electronic output to a format used in said vibrator control electronics; and
   means for transferring said converted electronic output of the compass to the vibrator control electronics to direct the orientation of the omnidirectional shear wave source.

5. The apparatus according to claim 4 wherein said obtaining means includes:
   means for obtaining a signal representing a heading from magnetic north.

6. The apparatus according to claim 5 wherein said means for converting includes:
   means for computing orientation angle data required by the vibrator control electronics to control the direction of radiation of the energy source from the heading input and the compass input.

7. The apparatus according to claim 4 wherein said means for transferring includes:
   decoder means for receiving an address output from said obtaining means;
   latch means connected to said decoder means for receiving and holding data input from said obtaining means and outputting said data to said vibrator control electronics; and
   control lines connected to said latch means for controlling the output of said latch means to said vibrator control electronics.

8. An apparatus for controlling the orientation of an omnidirectional shear wave source in a system comprising:
   vibrator control electronics;
   means for obtaining an electronic output of a signal representing a heading from magnetic north of the omnidirectional shear wave source;
   means associated with said obtaining means for processing said electronic output through signal processing electronics to compute data required to control the direction of radiation of the energy source from the heading input and the compass input and for converting said electronic output to a format used in said vibrator control electronics; and
   means for transferring said converted electronic output of the compass to the vibrator control electronics to direct the orientation of the omnidirectional shear wave source, said means for transferring including decoder means for receiving an address output from said obtaining means, latch means connected to said decoder means for receiving and holding data input from said obtaining means and outputting said data to said vibrator control electronics and control lines connected to said latch means for controlling the output of said latch means to said vibrator control electronics.

* * * * *